(12) United States Patent
Johnson et al.

(10) Patent No.: US 7,590,819 B2
(45) Date of Patent: Sep. 15, 2009

(54) COMPACT MEMORY MANAGEMENT UNIT

(75) Inventors: Stephen B. Johnson, Colorado Springs, CO (US); Brad D. Besmer, Colorado Springs, CO (US); Timothy E. Hoglund, Colorado Springs, CO (US); Jana L. Richards, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 317 days.

(21) Appl. No.: 11/124,536

(22) Filed: May 9, 2005

(65) Prior Publication Data
US 2006/0253684 A1 Nov. 9, 2006

(51) Int. Cl.
G06F 12/00 (2006.01)
G06F 9/26 (2006.01)
G06F 9/34 (2006.01)

(52) U.S. Cl. ..................................................... 711/203
(58) Field of Classification Search .................. 711/203
See application file for complete search history.

(56) References Cited

U.S. PATENT DOCUMENTS

| | | | | |
|---|---|---|---|---|
| 3,976,978 A * | 8/1976 | Patterson et al. | ............ | 711/208 |
| 4,035,779 A * | 7/1977 | Birney et al. | ................ | 711/164 |
| 4,365,295 A * | 12/1982 | Katzman et al. | ............ | 711/206 |
| 4,532,606 A * | 7/1985 | Phelps | .......................... | 365/49 |
| 5,617,553 A * | 4/1997 | Minagawa et al. | .......... | 711/206 |
| 5,796,978 A * | 8/1998 | Yoshioka et al. | ............ | 711/206 |
| 6,678,797 B2 * | 1/2004 | Chauvel et al. | ............. | 711/137 |
| 6,813,699 B1 * | 11/2004 | Belgard | ....................... | 711/213 |
| 2004/0193804 A1 * | 9/2004 | Buzby et al. | ................. | 711/130 |

OTHER PUBLICATIONS

Microsoft Computer Dictionary, 2002, Microsoft Press, Fifth Edition, pp. 326 and 419.*

* cited by examiner

Primary Examiner—Matt Kim
Assistant Examiner—Ralph A Verderamo, III
(74) Attorney, Agent, or Firm—Yee & Associates, P.C.

(57) ABSTRACT

A memory management unit (MMU) for a device controller that provides enhanced functionality while maintaining a small physical size or footprint, such that the die size required to manufacture the memory management unit circuitry within the device controller integrated circuit device remains small notwithstanding such enhanced functionality. This compact/tiny MMU provides virtual memory addressing and memory error detection functionality while maintaining a small physical die size. The small physical die size with enhanced functionality is obtained by improvements in translating virtual to physical addressing without use of extensive translation tables, which themselves would otherwise consume memory and associated die real estate. In addition, the MMU allows a firmware image containing code and data segments to be run-time swapped between internal shared context RAM and external memory.

9 Claims, 6 Drawing Sheets

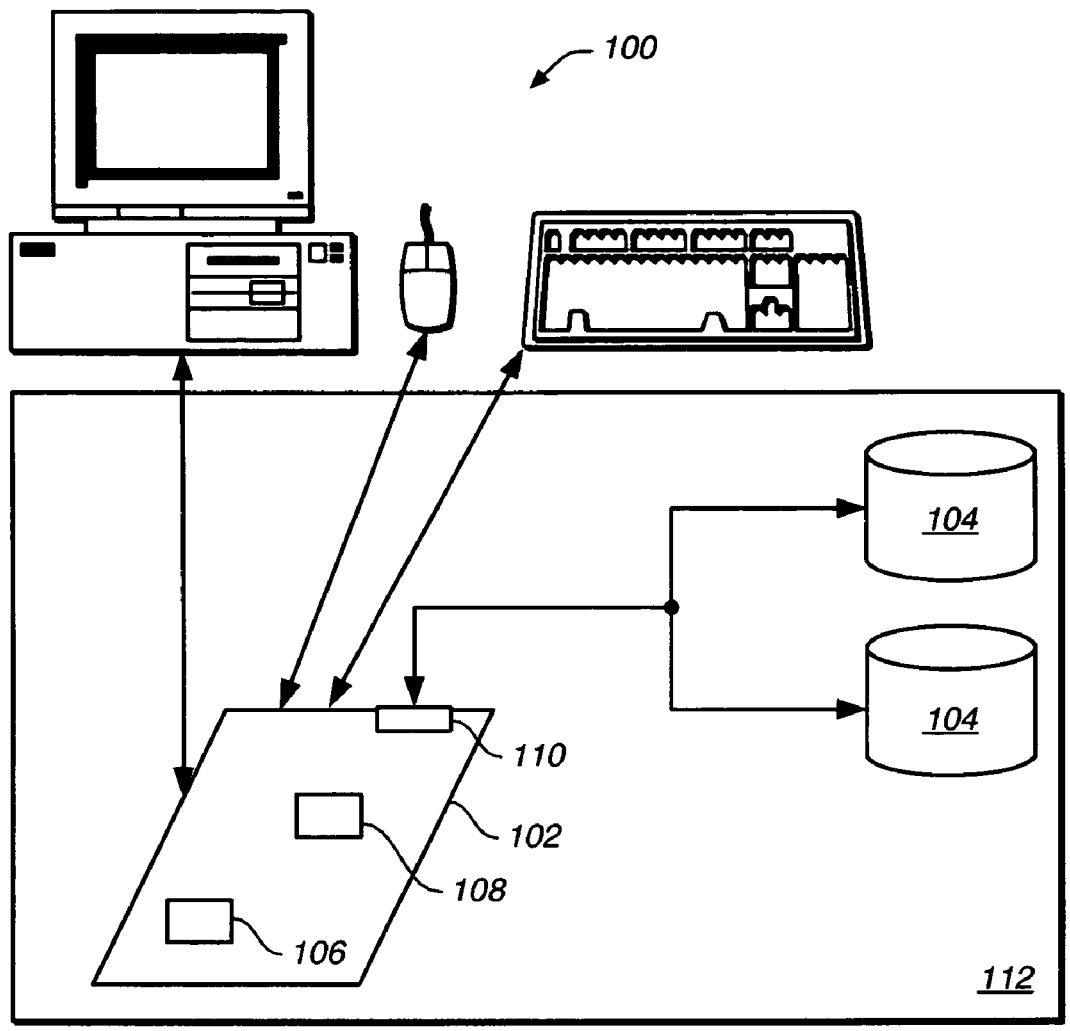
FIG._1
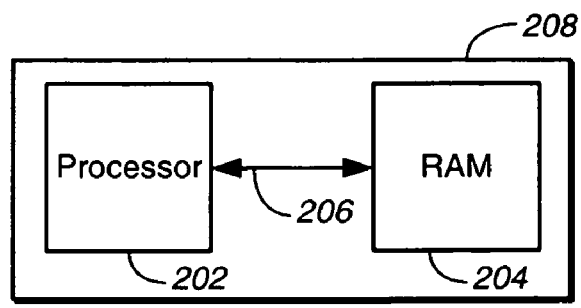
FIG._2

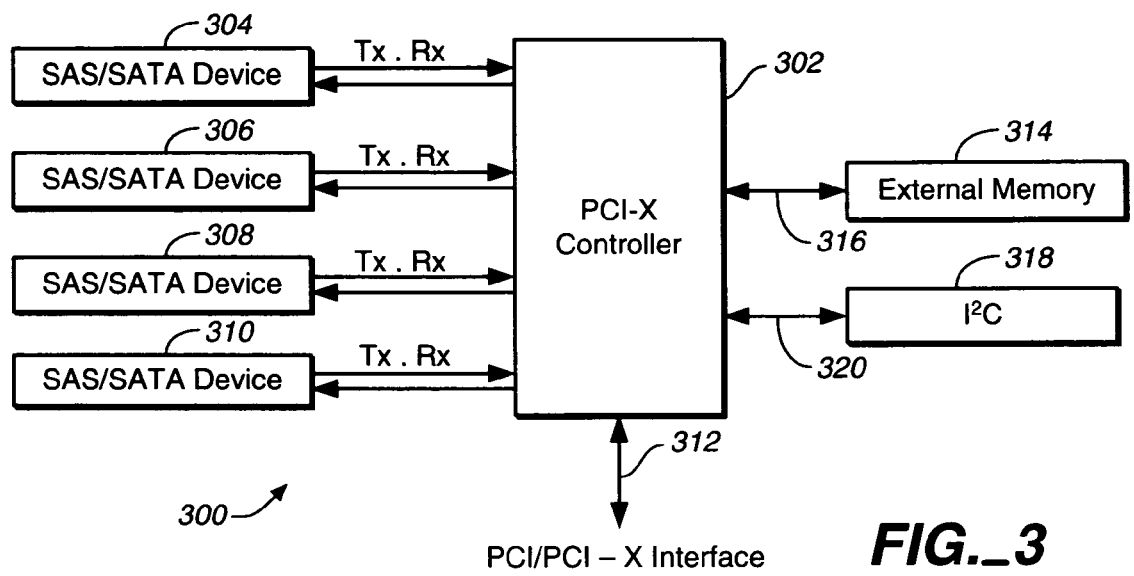
FIG._3
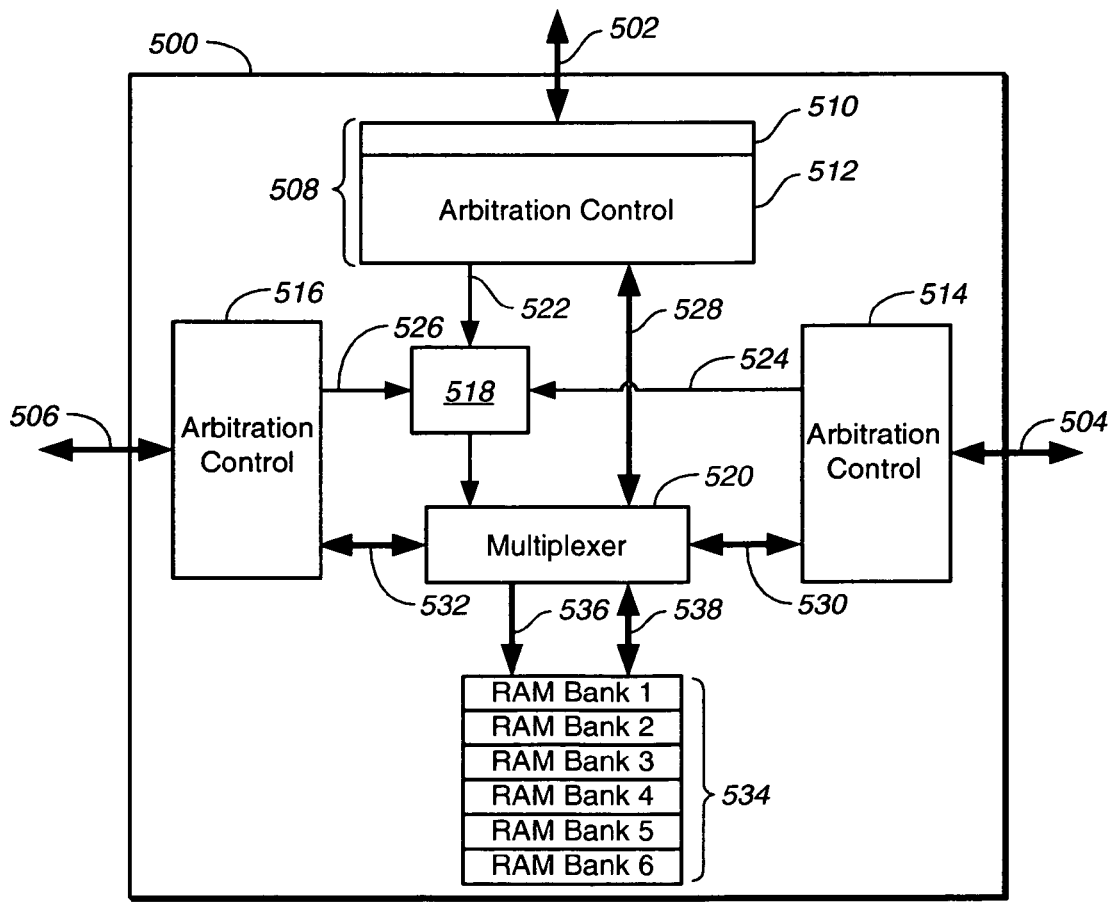
FIG._5

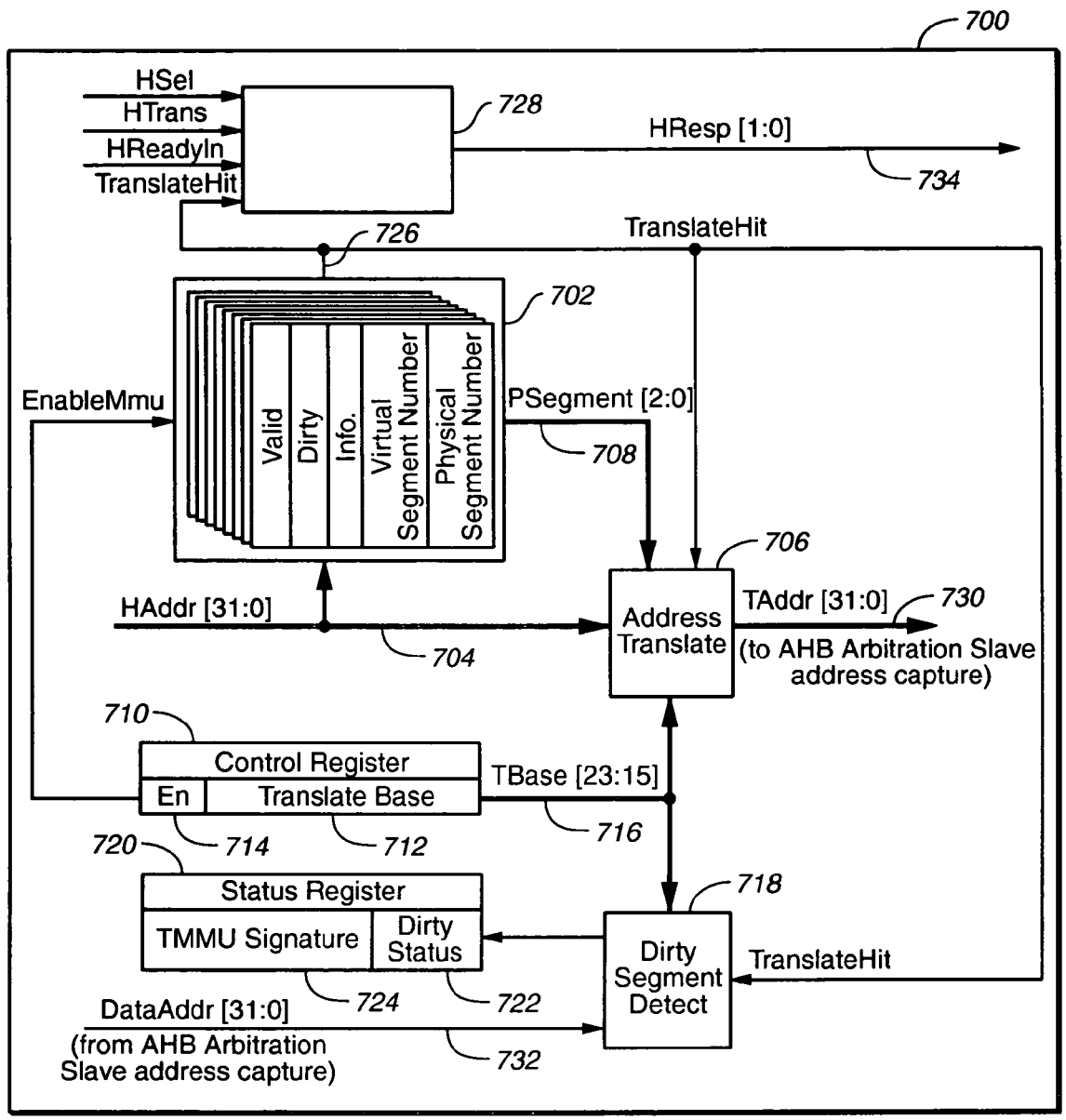
FIG.Z

COMPACT MEMORY MANAGEMENT UNIT

BACKGROUND OF THE INVENTION

1. Technical Field

The present invention is directed generally toward a method and apparatus for managing memory within an integrated circuit device, and more particularly is directed toward a memory management unit that provides run-time swap support for an integrated controller while maintaining a small physical footprint size.

2. Description of the Related Art

Certain types of input/output (I/O) devices for a computer system require a microprocessor, microcontroller or other type of device controller such as a dedicated state machine to facilitate co-action between the I/O device(s) and another controller or processor within the computer system. Such auxiliary device controllers off-load processing and control requirements that would otherwise be required of the other system processor (such as a primary central processing unit or CPU) in performing an I/O operation with a particular I/O device. Hard disk drives, either singularly or configured in a group such as a RAID (redundant array of inexpensive disks) group, are one such type of I/O device that benefits from having an I/O device controller to facilitate data transfer between the main system processor and the disk drive(s). The device controller is able to provide support for the particular type of interface or protocol that the I/O device(s) use to communicate with other computing devices such as a computer system. For example, serial-attached SCSI (SAS) is one type of interface/protocol that is used to communicate with a disk drive. In such an environment, a system motherboard containing a traditional system microprocessor such as an Intel Pentium processor has control circuitry, either in a dedicated integrated circuit device or as a sub-set of an integrated circuit device, for communicating with and transferring data to and from a disk drive using a given protocol. The I/O device control circuitry is easily accessed by the main or primary system processor at a high-level, thereby insulating the main/primary processor from the underlying details of communicating with the I/O device. One exemplary I/O controller contains an embedded input/output processor (IOP) known as an ARM microprocessor for providing the computational and control functionality within the I/O device integrated circuit controller.

Due to complexities introduced by certain types of protocols such as SAS, memory requirements for embedded controllers or processors such as ARM processors are increasing in order to provide advanced functionality such as error detection and correction, RAID support, increased buffering, etc. However, such increases in memory size come at a cost, as the larger the memory that is included in the device controller, the larger is the corresponding die size of the integrated circuit device. As many of today's computer systems are extremely cost-sensitive, there is a need to provide a flexible memory architecture in a device controller while maintaining a small die size or footprint for the circuitry required to provide such memory functionality. The present invention is directed to such a solution.

SUMMARY OF THE INVENTION

A memory management unit (MMU) for a device controller that provides enhanced functionality while maintaining a small physical size or footprint, such that the die size required to manufacture the memory management unit circuitry within the device controller integrated circuit device remains small notwithstanding such enhanced functionality. This compact/tiny MMU provides virtual memory addressing and memory error detection functionality while maintaining a small physical die size. The small physical die size with enhanced functionality is obtained by improvements in translating virtual to physical addressing without use of extensive translation tables, which themselves would otherwise consume memory and associated die real estate. In addition, the MMU allows a firmware image containing code and data segments to be run-time swapped between internal shared context RAM and external memory.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a diagram of a general purpose computer system.

FIG. 2 is a high-level diagram of a device controller with an embedded microprocessor and embedded RAM.

FIG. 3 depicts a typical application or environment for using a device controller such as the one shown in FIG. 2.

FIG. 5 depicts an internal block diagram of the various functional blocks provided within a context RAM having an embedded compact/tiny memory management unit.

FIG. 7 depicts an internal block diagram of the embedded compact/tiny memory management unit.

DETAILED DESCRIPTION

Figures 4, 4A:
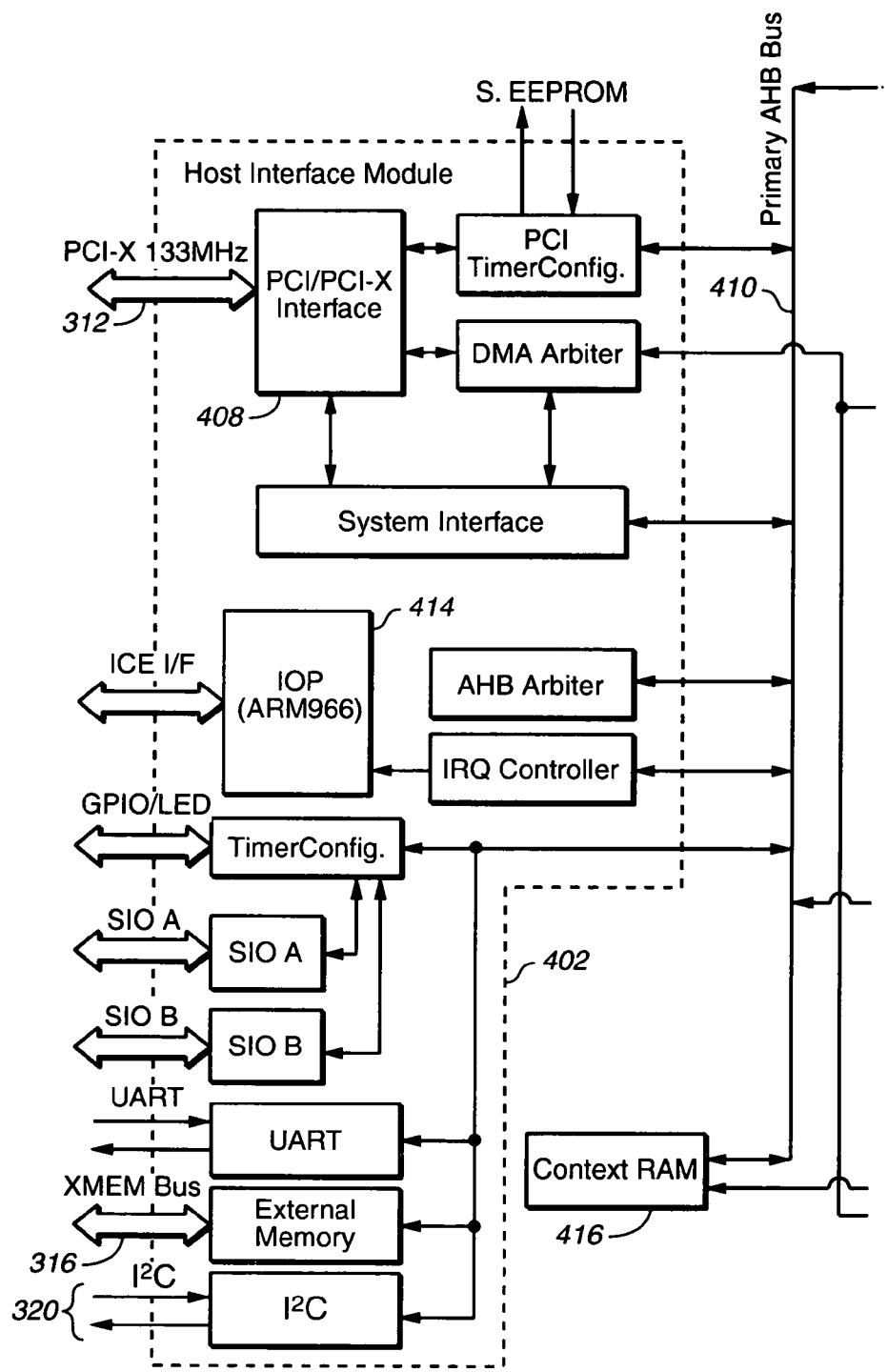
FIG. 4 depicts an internal block diagram of the various functional blocks provided within a device controller.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 1, there is shown a representative environment for which the present invention may be utilized. A data processing system is depicted at 100, a representative system being an IBM-compatible personal computer system. Such computer systems are capable of providing a wide-variety of application solutions based upon a somewhat standardized hardware platform that allows multiple software vendors to provide a wide variety of applications using such common platform. Such computer systems can also run various types of operating systems, such as the Microsoft Windows operating system or a Unix-based operation system such as Linux. One of the primary components within such a computer system is a system board or motherboard 102, contained within a rack or case 112, which typically contains a plurality of integrated circuit devices such as main processor 106 and device controller 108. Main processor 106 may be an Intel Pentium microprocessor or an AMD Athlon microprocessor. Device controller 108 may be a disk drive controller such as an LSISAS1068 controller (available from LSI Logic Corporation of Milpitas, Calif., and described in Technical Manual for LSISAS1068 PCI-X to 8-Port Serial Attached SCSI/SATA Controller, Version 2.0 dated February, 2005, DB14-000287-03, also available from LSI Logic Corporation, and such Technical Manual is hereby incorporated by reference as background material), used for interfacing one or more disk drives such as shown at 104 with main electronics board 102. Internal wiring planes (not shown) connect the device controller 108 with a connector 110, and the one or more disk drives 104 connect to the main electronics board 102 using such connector 110. Device controller 108 typically contains some type of internal processor or controller such as a microprocessor or microcontroller. In the preferred embodiment, device controller 108 contains an embedded ARM microprocessor with embedded context memory. The present invention is particularly directed to memory management circuitry within device controller 108 that is used to facilitate and coordinate access to the embedded context memory by the ARM microprocessor. Other types of processing devices, computer devices, computer systems or computer servers, either general-purpose or specialized, can also utilize the techniques of the present invention that are disclosed herein. Also shown in FIG. 1 are traditional input/output (I/O) devices such as a display, mouse and keyboard which facilitate user interaction with the computer system 100.

Turning now to FIG. 2, there is shown at 208 a high-level block diagram of a device controller, such as device controller 108 shown in FIG. 1, containing an ARM microprocessor 202 (in the preferred embodiment an ARM966 microprocessor) coupled to a context RAM 204 using AHB bus 206. The ARM processor, as is known in the art, is a programmable controller or CPU that can be used to perform a wide variety of controller functionality depending upon the particular microcode that it executes. The ARM microprocessor is particularly well-suited for use as an input/output processor (IOP) for supporting one or more input/output devices of a data processing or computer system. The context RAM 204 provides temporary storage of code and data segments, as well as providing buffering space, for the ARM controller. As controller applications become more complex, the amount of RAM memory needed to support such increased complexity generally increases as well. However, such increase in RAM memory capacity necessarily translates to an increased manufacturing cost for the device controller 208, as at least some portion of the overall manufacturing cost of an integrated circuit device is directly proportional to the overall physical size, such as the die size, of the integrated circuit device. The present invention provides an improved technique for managing memory for a controller such as an ARM controller such that enhanced functionality can be provided without merely increasing the overall size of the RAM. In addition, such enhanced memory management is itself provided in an extremely compact physical design, thus minimizing total manufacturing cost of the device controller 208.

Turning now to FIG. 3, there is shown a typical application using the above described device controller 208. Shown at 300 is an example of a device controller 302 (which is equivalent to device controller 108 shown in FIG. 1 and device controller 208 shown in FIG. 2), shown in the preferred embodiment as a PCI-X controller. This PCI-X controller is used to couple a plurality of storage devices 304, 306, 308 and 310 to a PCI or PCI-X bus by way of PCI/PCI-X interface 312. In the preferred embodiment, these storage devices 304, 306, 308 and 310 comprise serial-attached SCSI (SAS) and serial ATA (SATA) devices, and data is transferred to/from such storage devices and the controller 302 using the Tx (transmit) and Rx (receive) data paths as indicated. Microcode used to control operation of the controller 302 is stored in external memory 314, which may be flash ROM, pipelined synchronous burst SRAM (PSBRAM), or non-volatile SRAM (NVSRAM). The external memory 314 is coupled to the controller 302 via address/data/control bus 316. The controller 302 also has a serial bus interface 320, which in the preferred embodiment is an I$^2$C bus interface to support attachment of I$^2$C compliant devices such as device 318 across I$^2$C bus 320.

Figure 4B:
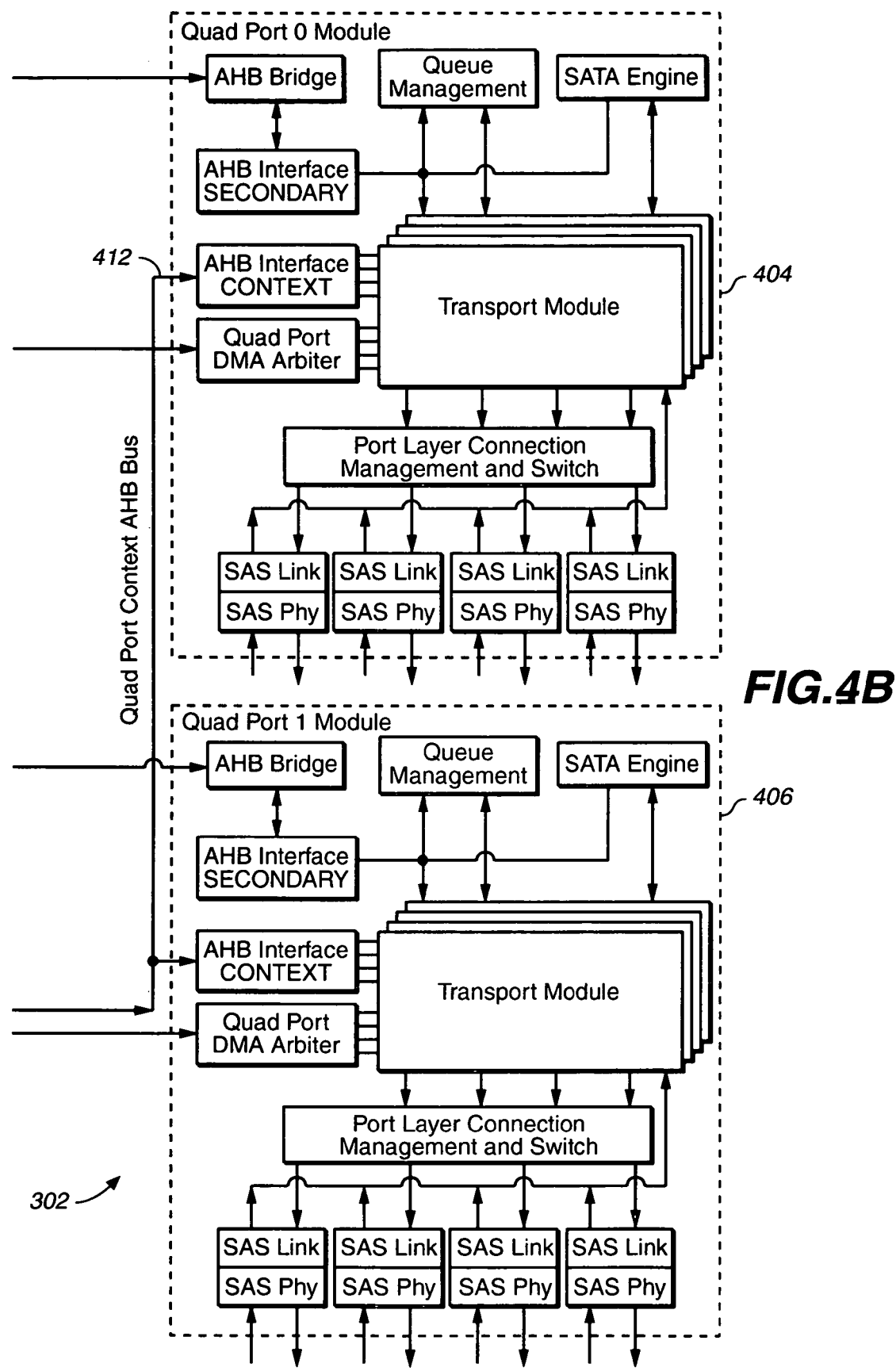

Turning now to FIG. 4 (which is comprised of FIGS. 4A and 4B), controller 302 is depicted in a detailed block diagram form, the blocks showing the functionality contained within such controller 302. Controller 302 is logically organized as having a host interface module portion 402, and a couple of Quad (i.e. four) Port Modules, shown as Quad Port 0 Module 404 and Quad Port 1 Module 406. The host interface module 402 includes PCI/PCI-X interface circuitry 408 to interface the controller 302 with a PCI-X bus 312. Host interface module 402 also provides the interfaces to external memory by way of XMEM bus 316, as well as the interface to I$^2$C compliant devices across I$^2$C bus 320. Each quad port module supports up to four (4) storage devices, such as storage devices 304, 306, 308 and 310 shown in FIG. 3. A primary AHB bus 410 and Quad Port Context AHB bus 412 are used to provide internal communication between the various internal circuitries within controller 302. The present invention is specifically directed to memory management that provides operational co-action between the embedded IOP 414, in the preferred embodiment an ARM966 microprocessor/controller, and the internal context RAM 416, as will be further described below.

Turning now to FIG. 5, there is shown at 500 the overall architecture of a context RAM (such as context RAM 204 in FIG. 2 and context RAM 416 in FIG. 4) with an embedded memory management unit in accordance with the present invention. The context RAM 500 communicates with (i) IOP 414 of FIG. 4 via primary AHB bus 502 (such bus also being shown at 410 in FIG. 4), (ii) Quad Port 0 module 404 of FIG. 4 via Secondary-0 AHB bus 504, and (iii) Quad Port 1 module 406 of FIG. 4 via Secondary-1 AHB bus 506 (Secondary-0 AHB bus 504 and Secondary-1 AHB bus 506 as shown in FIG. 5 are a part of the Quad Port Context AHB Bus 412 depicted in FIG. 4). Primary AHB bus 502 is internally coupled to context RAM 500 via memory management unit 508, such memory management unit 508 comprising a compact memory management unit control block 510 and an arbitration slave control block 512. Secondary-0 AHB bus 504 is internally coupled to context RAM 500 via arbitration slave control block 514. Similarly, Secondary-1 AHB bus 506 is internally coupled to context RAM 500 via arbitration slave control block 516. Arbitration slave control blocks 512, 514 and 516 are each coupled to context arbiter block 518, which itself is coupled to address/control and data multiplexer block 520. Context arbiter block 518 provides arbitration between the arbitration slave control blocks 512, 514 and 516 and the address/control and data multiplexer block 520 per standard arbitration techniques using address and control signals on address/control buses 522, 524 and 526. Internal data busses 528, 530 and 532 provide a direct path between each of the arbitration slave control blocks and the address/control and data multiplexer block 520. Address/control and data multiplexer block 520 provides a plurality of multiplexers for selectively supplying the appropriate address, control and data values from one of external busses 502, 504 and 506 (as determined by the context arbiter 518) to embedded RAM 534 via address/control bus 536 and data bus 538. Embedded RAM 534 is organized into six (6) RAM banks shown as RAM Bank 1-RAM Bank 6, as will be further described below.

Figure 6:
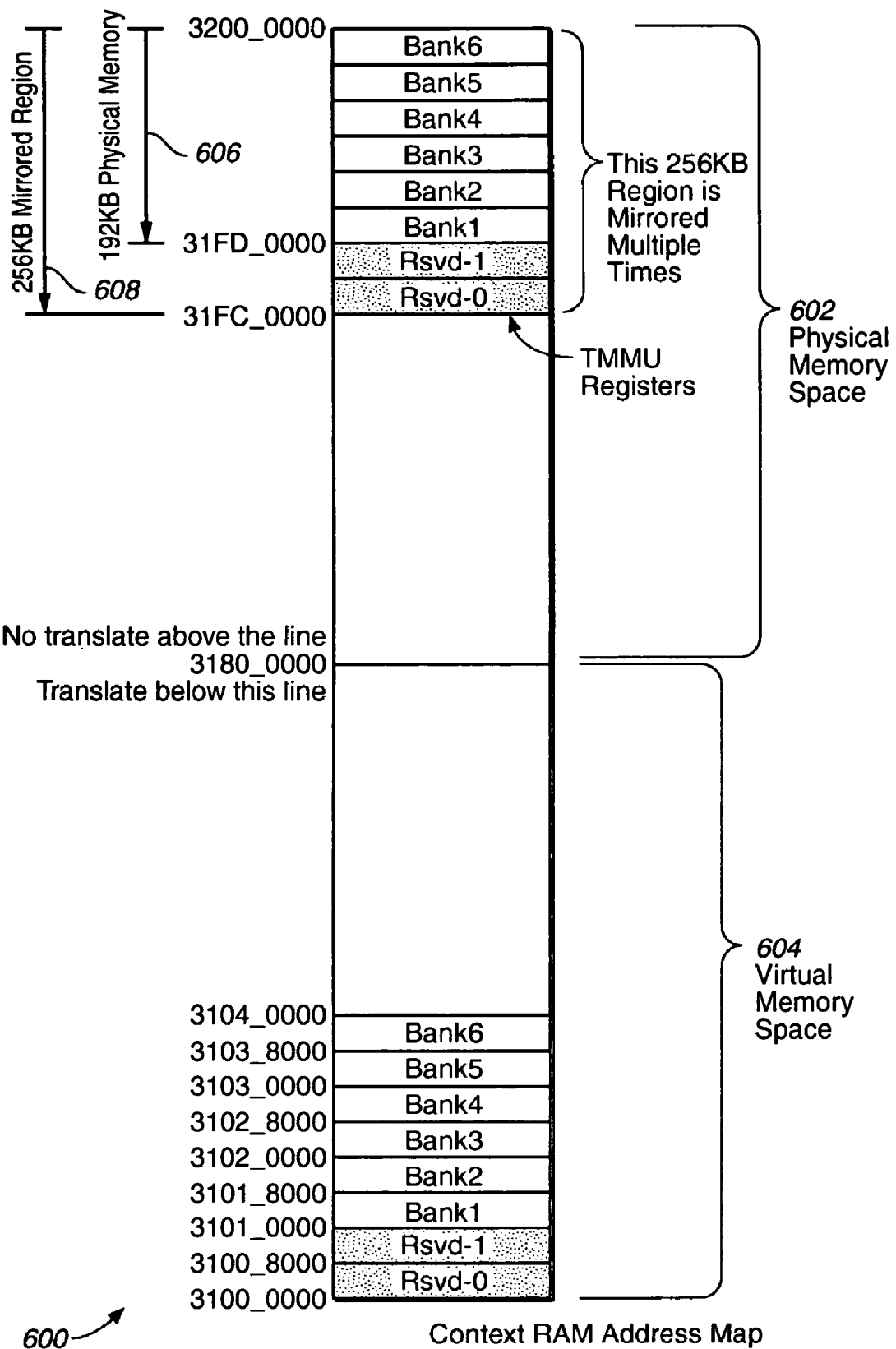
FIG. 6 depicts an internal address map of the context RAM shown in FIG. 5.

Turning now to FIG. 6, there is shown at 600 the address map of the internal/embedded RAM depicted at 534 in FIG. 5. This address map 600 is generally organized into a physical memory space 602 and a virtual memory space 604. The physical memory space 602 spans memory addresses 3180_0000 to 3200_0000 in the preferred embodiment, although the particular numeric boundaries are not critical and can be located elsewhere in other embodiments. The virtual memory space 604 spans memory addresses 3100_0000 to 317F_FFFF in the preferred embodiment, although again these specific numeric boundaries are not critical to the present invention. The virtual memory space 604 is the memory space typically accessed by an input/output processor such as ARM controller 202 shown in FIG. 2, such virtual memory space containing virtual memory bank1-virtual memory bank6. As will be later described, memory addresses 3100_0000-3100_FFFF are reserved as the corresponding physical memory space associated with these virtual addresses is reserved for use by control registers for the compact memory management unit.

The physical memory space 602 is where the actual physical memory is located, such as RAM Bank1-RAM Bank6 shown in FIG. 5 at 534. Bank6 is shown as the top of the physical memory space (ending at the memory location/address immediately below 3200_0000), followed immediately by Bank5, followed immediately by Bank4, and continuing down to Bank1, which is shown starting at memory location/address 31FD_0000. Each of these memory banks is 32 KByte in size, and thus the total physical memory size of RAM Bank1-RAM Bank6 is 192 Kbytes (as shown at 606). Each of these banks, as will be further described below, is further segmented into a plurality of 4 KB segments as specified by associated segment descriptor registers, and these 4 KB segments are selectively swapped with other memory such as a host general-purpose memory. Also shown in this physical memory space 602 are two reserved banks RSVD-0 and RSVD-1, located respectively at 31FC_0000 and 31FC_8000, which are reserved for use by control registers in the compact memory management unit, as will be further described below. The conglomerate of the two reserved banks RSVD-0/RSVD-1 and Bank1-Bank6 thus encompass a 256 KB memory region that is shown at 608. This 256 KB memory region is mirrored sixty three (63) times within physical memory space 602 to create a total of sixty four (64) 256 KB memory regions within physical memory space 602, between addresses 3180_0000 and 31FF_FFFF.

Now that the architectural organization and address space for the memory management unit and internal RAM has been described, the operation of such memory management unit will now be described. A key aspect of the present invention is an ability to efficiently provide address translation of virtual addresses used by an external device such as IOP 414 (shown in FIG. 4) to internal addresses of actual physical memory locations. Prior memory management units, which provide such address translation, typically maintain large look-up tables to perform such translation, and in some instances there are numerous of such translation tables chained together. Upon receipt of a virtual address, these traditional memory management units would access these large tables to determine the proper virtual-to-real address translation. These traditional memory management units also typically contain internal cache, a special form of high speed memory used to improve performance. In effect, these traditional memory management units consume memory to manage memory, with the translation tables and cache, and hence as memories are increased in size to provide more functionality for a given application, the memory management unit itself also increases in size, thereby significantly increasing the physical size of the memory management unit and thus increasing the cost of manufacturing a device containing such memory management unit. With the present invention, a more efficient memory translation of virtual to real addresses is provided that does not use large translation tables.

The compact or tiny memory management unit of the present invention, also referred to herein as a TMMU, allows a firmware image containing code and data segments to be run-time swapped between internal shared context RAM and host memory. This memory management unit sits in the front end of the Primary AHB port of the Context Ram module, as depicted at 510 in FIG. 5. The TMMU detects virtual segment hits and misses within a 256 KB virtual address space. It also provides an AHB error response upon virtual segment miss by vectoring the IOP processor to a Prefetch Abort or Data Abort handler for segment swap. The TMMU translates a virtual address to physical address upon virtual segment hit. This TMMU also detects writes to virtual segment hits and indicates which segments are "Dirty" or "Clean". Finally, this TMMU captures error address information to simplify abort handler processing. As will be seen from the following description, the TMMU segment size is 4 KB, there are eight (8) segment descriptor registers, there is a Valid, Dirty and Info bit maintained in each of the segment descriptor registers, the translate base address is programmable, and TMMU enable/disable control is provided.

Turning now to FIG. 7, there is shown in block diagram form at 700 the compact/tiny memory management unit (TMMU). Eight (8) segment descriptor registers are provided at 702. Each of these segment descriptor registers is associated with a particular segment or block of logical memory. In the preferred embodiment, the segment size is 4 KB and the use of eight segment registers thus allows a given 32K bank (such as any of Bank1-Bank6 shown in FIG. 6) to be organized and managed, such as code or data swapping, at a 4 KB segment granularity. Each segment descriptor register contains a valid bit (which when set indicates that the specified virtual segment is valid and will be mapped to the associated physical segment), a dirty bit (which when set indicates that a write has been detected to an address within this segment), an info bit (a general purpose read/write status bit that could be used for such things as indicating whether this segment contains code or data), a virtual segment number (for specifying/maintaining a virtual segment number), and a physical segment number (for specifying/maintaining a physical segment number). By organizing the segment information in this fashion, only a very small amount of memory is needed for the virtual-to-physical translation as only eight (8) possible segment translations exist within a given bank. Thus, there is no need for a cache for the TMMU, nor is there a need for large translation tables with associated walking or traversing of such tables. Instead, all translations are done directly or in-line. Continuing with FIG. 7, the incoming host address HAddr from primary AHB port 502 (as shown in FIG. 5) is shown at 704, and is coupled to both the segment descriptor registers 702 for comparison, as well as coupled to the address translate block 706. A three-bit physical segment value, shown at 708 as PSegment[2:0] and provided at an output of block 702, is also coupled to address translate block 706 and indicates the physical segment number for the currently active memory segment. A control register 710 maintains the translate base address 712 used in the address translation, as further described below, as well as an enable bit 714 for enabling the memory management unit segment descriptor register compare operation within block 702. The translate base address 712 is programmable, and points to the beginning of a given 32 KB bank of a physical swap region in memory, such as any of the banks Bank1-Bank6 shown in FIG. 6. Certain bits of the translate base address, shown at 716 as TBase[23:15], are coupled to the address translate block 706 as well as dirty segment detect block A status register 720 maintains dirty status at 722 (a read-only mirror of the dirty bits contained within the eight (8) segment descriptor registers), as well as a TMMU signature at 724 (for identification of the type/capability of TMMU that is managing the context RAM). If a translate operation is required, as will be further described below, the compare logic within the segment descriptor register block 702 generates at TranslateHit signal at 726, which is coupled to address translate block 706, dirty segment detect 718 and AHB Slave Response Generation block 728. The output of address translate block 706 is the translated address, shown at 730 as TAddr[31:0], which is provided to address capture circuitry of the AHB arbitration slave control block (shown at 512 in FIG. 5) for subsequent use in accessing the context memory (shown at 534 in FIG. 5). DataAddr[31:0], shown at 732, comes from the AHB arbitration slave control block and is coupled to the dirty segment detect block 718. Another control signal provided to the AHB arbitration slave control block is HResp[1:0], shown at 734, which provides response status. This two bit value is generated from AHB slave response generation block, and is based upon various status bits including a host select bit HSel, a host transfer bit HTrans, a host ready input bit HReadyIn, and the aforementioned TranslateHit status bit 726.

Before describing the address translation operation, a description of the TMMU register map is in order. As shown below in Table 1, the various segment descriptor, control and status registers just described are shown with their corresponding offset location in the context memory address space. These offset values correspond to the context RAM address map previously described with respect to FIG. 6.

TABLE 1

| OFFSET | REGISTER NAME |
|---|---|
| 0xFC0000 | Segment 0 Descriptor |
| 0xFC0004 | Segment 1 Descriptor |
| 0xFC0008 | Segment 2 Descriptor |
| 0xFC000C | Segment 3 Descriptor |
| 0xFC0010 | Segment 4 Descriptor |
| 0xFC0014 | Segment 5 Descriptor |
| 0xFC0018 | Segment 6 Descriptor |
| 0xFC001C | Segment 7 Descriptor |
| 0xFC0020 | TMMU Control |
| 0xFC0024 | TMMU Error Information |
| 0xFC0028 | TMMU Status |
| 0xFC002C to 0xFC7FFFF | reserved |

The error information register shown in Table 1 includes a flag that when set indicates that the last virtual segment miss was a data write access, and when clear indicates that the last virtual segment miss was either a data read or instruction prefetch access. This error information register also includes address information pertaining to the last virtual segment miss, in order to simplify construction and operation of the data abort handler by removing the need to extract the faulting referenced data address from the faulting instruction.

The address translation performed by the compact or tiny memory management unit (TMMU) will now be described. When enabled, the TMMU block 510 of FIG. 5 monitors the Primary AHB bus 502 for accesses to the context RAM address space (such as address space 600 shown in FIG. 6). Accesses to the context RAM are categorized as "Untranslated" or "Translated" based on their address. Should an access (a read or a write) be performed to a "Translated" address, the TMMU 510 will compare the incoming AHB address to the contents of its eight (8) segment descriptor registers. Should a valid entry in one of these descriptor registers match the incoming AHB address, the address will be translated according to Table 2 below. Alternatively, if no valid entry is found in one of these descriptor registers, an AHB error response will be generated which will cause the ARM processor to vector to either a Prefetch or Data handler routine to manage the segment fault.

TABLE 2

| STATE | INCOMING ADDRESS | AHB SLAVE RESPONSE | TRANSLATE ADDRESS | NOTE |
|---|---|---|---|---|
| Disabled | 0x3XXX_XXXX | OKAY | Untranslated | |
| Enabled | 0x31FF_FFFF–0x31FD_0000 | OKAY | Untranslated | 1 |
| Enabled | 0x31FC_FFFF–0x31FC_8000 | OKAY | Untranslated | 2 |
| Enabled | 0x31FC_7FFF–0x31FC_0000 | OKAY | Untranslated | 3 |
| Enabled | 0x31FB_FFFF–0x3180_0000 | OKAY | Untranslated | 4 |
| Enabled | 0x317F_FFFF–0x3101_0000 | OKAY or ERROR | Translated | 5 |
| Enabled | 0x3100_FFFF–0x3100_0000 | OKAY or ERROR | Translated | 6 |

Notes:
1 This region contains the six (6) 32 KB banks of physical Context RAM. The translate base address TranslateBaseAddr should be set to the address of the start of one of these banks.
2 This region contains no physical memory but will complete a cycle without error.
3 This region contains the TMMU register set.
4 This region mirrors the contents of 31FC_0000 to 31FF_FFFF (63 mirror images)
5 This region defines the virtual address space for code and data. Address translation occurs as follows for a translate hit (i.e. a virtual segment match):
TAddr = {HAddr[31:24], TBase[23:15], PhysicalSegment[2:0], HAddr[11:0]}, where HAddr is the incoming AHB address from a host processor.
6 This region is reserved and should not be accessed.

As can be seen, when the host memory address HAddr[31:0] provided to the TMMU is between 0x3101_0000-0x317F_FFFF, the resulting translated address TAddr is composed using high-order bits 31-24 of this host memory address HAddr (FIG. 7, element 704), bits 23-15 of the translate base address TBase (FIG. 7, element 712), bits 2-0 of the physical segment PhysicalSegment (FIG. 7, element 708) and low-order bits 11-0 of the host provided address HAddr (FIG. 7, element 704). Thus, virtual to physical address mapping is provided without a need for large look-up or translate tables, greatly reducing the resulting size of the TMMU, by providing a direct or in-line address translation.

Another advantageous feature of the present invention is improved and optimized swapping. When accessing one of the virtual segments, and based on the valid bit in the corresponding segment descriptor register, a quick determination can be made on whether to proceed with the memory access (no swap needed), or whether to cause a processor exception (to trigger a swap operation by the processor). However, if this is a data segment (as contrasted to a code segment), the dirty bit in the corresponding segment descriptor register is useful in determining whether a swap is actually required. If the dirty bit indicates data has been modified by a write, a swap is mandated whereas if the dirty bit indicates data has not been modified by a write, the current data in the segment does not have to be saved prior to loading new data into the segment per the swap operation.

An improved memory management method and apparatus has thus been described that provides a highly efficiently mechanism for providing virtual to physical address translation when accessing memory without significantly adding to the overall size, and hence mitigating associated manufacturing cost, of such memory. The present invention also advantageously allows for increasing the size of memory used in a particular application without a corresponding increase in size of the translation management circuitry associated with such memory, thus providing more functionality by such memory capacity increase while mitigating die size of such capacity increase and its associated cost.

What is claimed is:

1. A memory, comprising:
    a RAM portion comprising a plurality of segments;
    a memory management unit embedded within the RAM portion;
    a bus internally coupled to the RAM portion through the memory management unit;
    a control portion in the memory management unit, wherein the control portion comprises a plurality of segment registers that maintain segment swap information and a control register that provides an enable bit to enable the plurality of segment registers, wherein each of the plurality of segment registers specifies a given one of the plurality of segments, and wherein the plurality of segment registers further each comprise a corresponding virtual segment number and a corresponding physical segment number, and wherein the control portion is configured to perform translation, the translation comprising steps of:
    monitoring the bus for an access to a memory address space in the RAM;
    detecting whether an address of an access to the RAM is within an address range that is predetermined to indicate that a translation is required;
    responsive to detecting an access address range indicating translation is required, comparing the access address to contents of the plurality of segment descriptor registers;
    checking whether a valid bit is set in each of the plurality of segment descriptor registers;
    responsive to a valid bit being set in a segment descriptor register that matches the access address, translating the access address, the translated address comprising bits of the access address;
    responsive to a valid bit not being set in a segment descriptor register, generating an error response; and
    vectoring to one of a prefetch or a data handler routine to manage the generated error response.

2. The memory of claim 1, wherein each segment descriptor register comprises a valid bit, a dirty bit, and an info bit.

3. The memory of claim 2, wherein the translation performed by the control portion further comprises steps of:
    detecting, based on the info bit, that the access is a write to a virtual data segment;
    determining, based on a setting of the dirty bit, whether the data has been modified by the write access; and
    responsive to an indication that the data is modified, mandating a swap for the virtual data segment.

4. The memory of claim 1, wherein translating results in a translated address composed using high order bits of the access address, bits of a translate base address, bits of a physical segment, and low order bits of the access address.

5. A data processing system, comprising:
    a processor;
    main memory;
    a context memory, wherein the context memory comprises a plurality of banks of memory, wherein each of the plurality of banks are segmented into a plurality of segments that are each 4KB in size and are specified by associated segment descriptor registers;
    a memory management unit control block embedded within the context memory comprising eight segment descriptor registers, each segment descriptor register specifying a 4KB segment of the context memory, the memory management unit control block maintaining segment swap information, wherein certain of the plurality of segments are selectively swapped at run-time with the main memory based on a received memory address and the segment swap information, and wherein the memory management unit control block performs translation, the translation comprising:
    monitoring a bus communicatively coupled to the context memory through the memory management unit control block for an access to a memory address space in the context memory;
    detecting whether an address of an access to the context memory is within an address range that is predetermined to indicate that a translation is required;
    responsive to detecting an access address range indicating translation is required, comparing the access address to contents of the plurality of segment descriptor registers;
    checking whether a valid bit is set in each of the plurality of segment descriptor registers;
    responsive to a valid bit being set in a segment descriptor register that matches the access address, translating the access address, the translated address comprising bits of the access address;
    responsive to a valid bit not being set a segment descriptor register, generating an error response; and
    vectoring to one of a prefetch or a data handler routine to manage the generated error response.

6. The data processing system of claim 5, wherein each segment descriptor register comprises a valid bit, a dirty bit, and an info bit.

7. The data processing system of claim 6, wherein the memory management unit control block further performs translation by:
  detecting, based on the info bit, that the access is a write to a virtual data segment;
  determining, based on a setting of the dirty bit, whether the data has been modified by the write access; and
  responsive to an indication that the data is modified, mandating a swap for the virtual data segment.

8. The method of claim 5, further comprising an enable bit in a control register of the memory management unit control block that activates the comparing operation of the segment descriptor registers.

9. The data processing system of claim 5, wherein translating results in a translated address composed using high order bits of the access address, bits of a translate base address, bits of a physical segment, and low order bits of the access address.

* * * * *